United States Patent
Oslizlo et al.

(10) Patent No.: US 9,469,276 B2
(45) Date of Patent: Oct. 18, 2016

(54) WINDSCREEN WIPER DEVICE

(71) Applicant: Federal-Mogul Corporation, Southfield, MI (US)

(72) Inventors: Michael Oslizlo, Milan, MI (US); Dennis E. Cox, Belleville, MI (US)

(73) Assignee: Federal-Mogul Corporation, Southfield, MI (US)

(*) Notice: Subject to any disclaimer, the term of this patent is extended or adjusted under 35 U.S.C. 154(b) by 0 days.

(21) Appl. No.: 13/714,497

(22) Filed: Dec. 14, 2012

(65) Prior Publication Data

US 2013/0152327 A1    Jun. 20, 2013

Related U.S. Application Data

(60) Provisional application No. 61/570,563, filed on Dec. 14, 2011.

(51) Int. Cl.
*B60S 1/40* (2006.01)
*B60S 1/38* (2006.01)
*B60S 1/32* (2006.01)

(52) U.S. Cl.
CPC .. *B60S 1/40* (2013.01); *B60S 1/32* (2013.01); *B60S 1/38* (2013.01); *B60S 1/3801* (2013.01); *B60S 1/3806* (2013.01);
(Continued)

(58) Field of Classification Search
CPC ................ B60S 1/3801; B60S 1/3806; B60S 2001/3813; B60S 2001/3815
USPC ............ 15/250.46, 250.44, 250.361, 250.39, 15/250.201
See application file for complete search history.

(56) References Cited

U.S. PATENT DOCUMENTS 2,767,419 A    10/1956    Horton
2,907,065 A    10/1959    MacPherson
(Continued)

FOREIGN PATENT DOCUMENTS

CA    1180515 A    1/1985
CN    1647980 A    8/2005
(Continued)

OTHER PUBLICATIONS

"Trico Teflon Shield", http://www.tricoproducts.com/Trade/WiperProducts/BeamBlades/TeflonShield; Dec. 12, 2012.
(Continued)

*Primary Examiner* — Monica Carter
*Assistant Examiner* — Stephanie Berry
(74) *Attorney, Agent, or Firm* — Robert L. Stearns; Dickinson Wright, PLLC

(57) ABSTRACT

A windscreen wiper device for cleaning a windshield of a vehicle is provided. The windscreen wiper device includes a wiper strip of a flexible material for sealing against the windshield to drive rain, snow, ice and other elements away therefrom. The windscreen wiper device also includes at least one carrier element extending between opposite and, at a minimum, downwardly curved end portions and in engagement with the wiper strip to bias it into a predetermined configuration. A frame structure includes a plurality of claws in engagement with the carrier elements between the end portions. The frame structure also includes a pair of end caps that are pivotably coupled to at least an adjacent portion of the frame structure and engage the end portions of the carrier elements.

14 Claims, 3 Drawing Sheets

(52) U.S. Cl.
CPC .. *B60S 2001/382* (2013.01); *B60S 2001/3813* (2013.01); *B60S 2001/3843* (2013.01); *Y10T 29/49826* (2015.01)

(56) References Cited

U.S. PATENT DOCUMENTS

| | | | |
|---|---|---|---|
| 3,192,551 A | 7/1965 | Appel | |
| 3,317,946 A | 5/1967 | Anderson | |
| 4,028,770 A | 6/1977 | Appel | |
| 4,807,326 A | 2/1989 | Arai et al. | |
| 5,048,145 A | 9/1991 | Takahashi et al. | |
| 5,257,436 A | 11/1993 | Yang | |
| 5,325,563 A | 7/1994 | Cayan | |
| 5,383,249 A * | 1/1995 | Yang | B60S 1/3801 15/250.201 |
| 6,000,093 A | 12/1999 | Charng | |
| 6,038,730 A | 3/2000 | Chen | |
| 7,373,688 B2 | 5/2008 | Aoyama et al. | |
| 7,526,832 B2 | 5/2009 | Matsumoto et al. | |
| 7,603,742 B2 | 10/2009 | Nakano et al. | |
| 7,636,980 B2 | 12/2009 | Nakano | |
| 7,775,337 B2 | 8/2010 | Moshenrose et al. | |
| 7,836,541 B2 | 11/2010 | Harita et al. | |
| 7,921,503 B1 | 4/2011 | Chiang | |
| 7,945,986 B2 * | 5/2011 | Kim | B60S 1/38 15/250.201 |
| 8,015,656 B2 | 9/2011 | Fujiwara et al. | |
| 8,151,406 B2 | 4/2012 | Machida et al. | |
| 8,181,308 B2 | 5/2012 | Kwon et al. | |
| 2007/0017055 A1 | 1/2007 | Simko | |
| 2008/0028564 A1 | 2/2008 | Ku | |
| 2008/0098559 A1 | 5/2008 | Machida et al. | |
| 2008/0134456 A1 | 6/2008 | Choi | |
| 2008/0155776 A1 | 7/2008 | Harita | |
| 2009/0044365 A1 | 2/2009 | Koppen et al. | |
| 2009/0113653 A1 | 5/2009 | Thienard | |
| 2010/0139027 A1 | 6/2010 | An et al. | |
| 2010/0293738 A1 | 11/2010 | Kim et al. | |
| 2011/0041280 A1 | 2/2011 | Choi et al. | |
| 2011/0056041 A1 | 3/2011 | Wu | |
| 2011/0131750 A1 | 6/2011 | Kwon et al. | |
| 2011/0162161 A1 * | 7/2011 | Amado | B60S 1/3801 15/250.361 |
| 2011/0162162 A1 | 7/2011 | Fujiwara et al. | |
| 2011/0258802 A1 | 10/2011 | Op'T Roodt et al. | |
| 2011/0265309 A1 | 11/2011 | Koppen et al. | |
| 2012/0180245 A1 * | 7/2012 | Ku | 15/250.32 |
| 2013/0133152 A1 | 5/2013 | Op'T Roodt et al. | |
| 2013/0305478 A1 * | 11/2013 | Kim et al. | 15/250.451 |

FOREIGN PATENT DOCUMENTS

| | | |
|---|---|---|
| CN | 101456407 A | 6/2009 |
| CN | 201357813 Y | 12/2009 |
| CN | 101654893 A | 6/2010 |
| CN | 101890919 A | 11/2010 |
| CN | 101959726 A | 1/2011 |
| CN | 101977800 A | 2/2011 |
| CN | 101992747 A | 3/2011 |
| CN | 102131682 A | 7/2011 |
| DE | 202006004273 U1 | 5/2006 |
| DE | 202011100429 U1 | 9/2011 |
| EP | 0236061 A2 | 9/1987 |
| EP | 2105362 A1 | 9/2009 |
| EP | 2338747 A2 | 6/2011 |
| FR | 2403243 A1 | 4/1979 |
| FR | 2781741 A1 | 2/2000 |
| FR | 2847311 A1 | 5/2004 |
| GB | 2234670 A | 2/1991 |
| JP | S38553 B | 1/1963 |
| JP | S5836748 A | 3/1983 |
| JP | S62270808 A | 11/1987 |
| JP | H09164916 A | 6/1997 |
| JP | 2006117116 A | 5/2006 |
| JP | 2011116365 A | 6/2011 |
| JP | 2011251567 A | 12/2011 |
| WO | 2006051722 A1 | 5/2006 |
| WO | 2007091397 A1 | 8/2007 |
| WO | 2011152507 A1 | 12/2011 |

OTHER PUBLICATIONS

"Denso Designer Blade", http://www.densoaftermarket.com/wiperblades.php; Dec. 12, 2012.

* cited by examiner

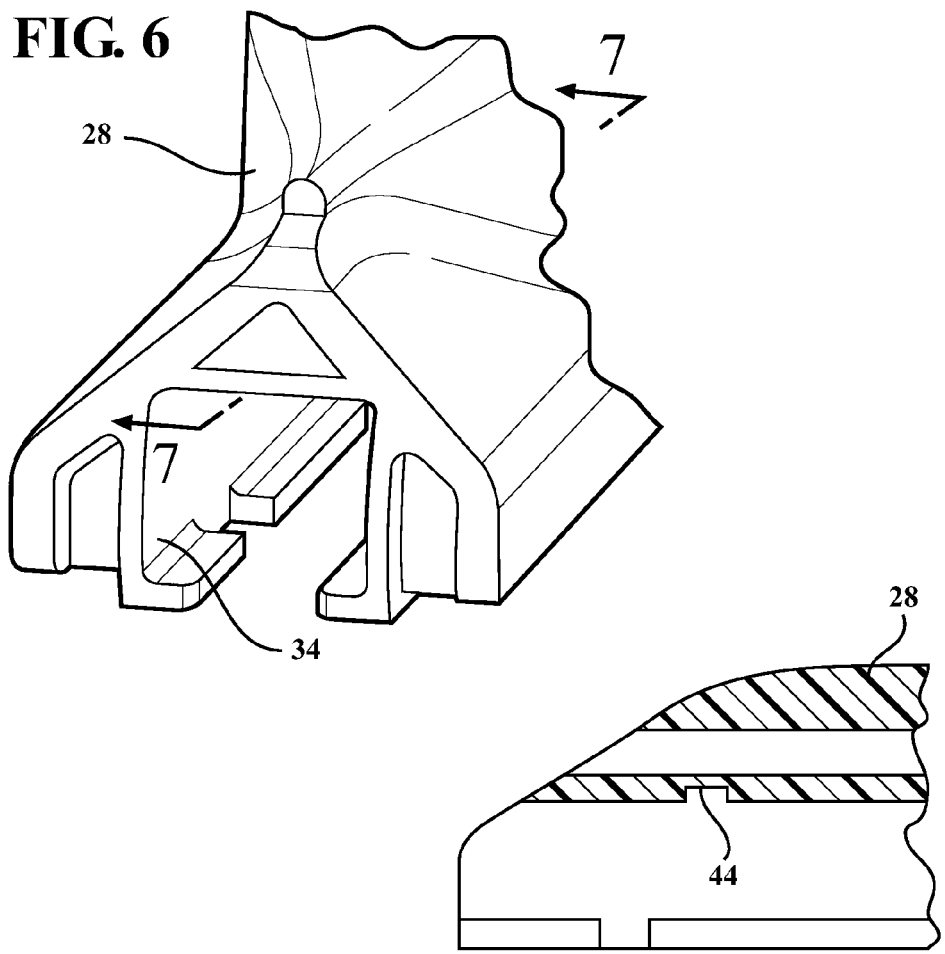
FIG. 6
FIG. 7
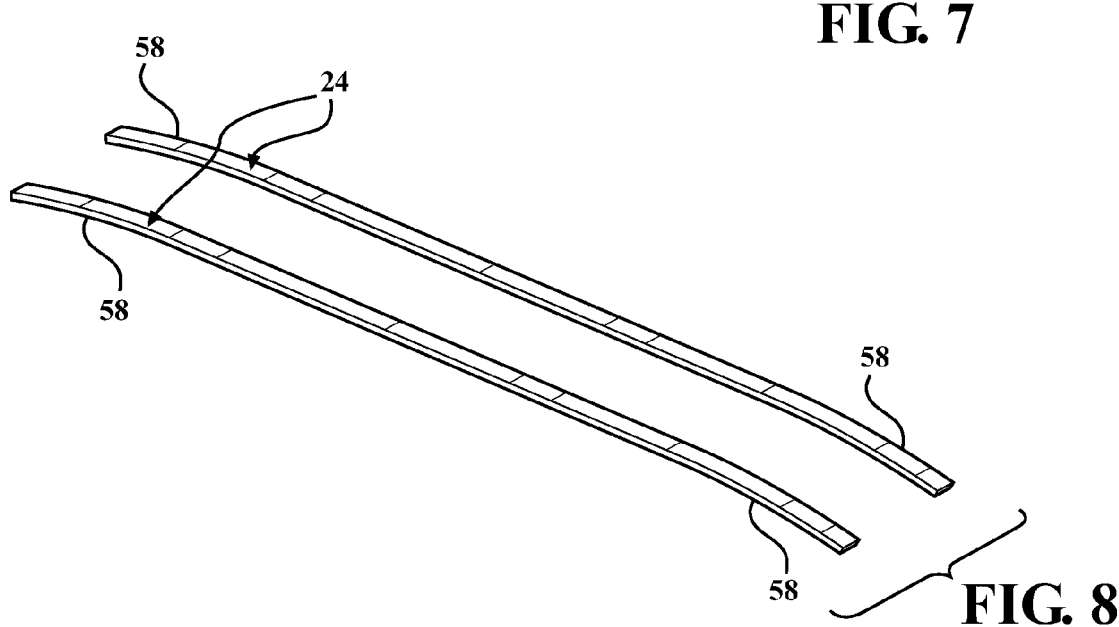
FIG. 8

WINDSCREEN WIPER DEVICE

CROSS REFERENCE TO RELATED APPLICATION

This application claims the benefit of application Ser. No. 61/570,563, filed Dec. 14, 2011, the entire contents of which is hereby incorporated by reference.

BACKGROUND OF THE INVENTION

1. Field of the Invention

The present invention is related generally to windscreen wiper devices for automobiles and more particularly to hybrid windscreen wiper devices.

2. Related Art

The majority of automotive windscreen wiper devices, or wiper blades, can be categorized as either conventional-style wiper blades (hereinafter referred to as "conventional blades") or beam-style wiper blades (hereinafter referred to as "beam blades"). Conventional blades typically include an elongated wiper strip, at least one carrier element (also known as a flexor) and a frame structure with a plurality of linkages and claws. The carrier elements are generally linearly shaped when in a relaxed state, and the frame structure distributes a force from a wiper arm across the lengths of the carrier elements and the wiper strip while allowing the carrier elements and wiper strip to flex and conform to the curvature of a vehicle's windshield. This establishes a seal between the wiper strip and the windshield.

Beam blades, in contrast to conventional blades, lack a frame structure. Instead, the carrier elements of beam blades are curved when in a relaxed state. When a beam blade is pressed against a windshield, the curved carrier elements conform the wiper strip to the curvature of the windshield and press substantially the entire length of the wiper strip against the windshield to establish the seal between the wiper strip and the windshield. Beam blades also typically include one or more spoiler elements, which use a flow of air over the beam blade to apply a down force on the carrier elements and the wiper strip while the vehicle is in motion to further press the wiper.

Some wiper blade manufacturers have begun producing and marketing "hybrid blades" which include certain features from both conventional and beam blades. Such hybrid blades typically include a frame structure, but the frame structure is covered by a spoiler-shaped cover piece that gives the otherwise conventional blade the down force effect of beam blades.

SUMMARY OF THE INVENTION

According to one aspect of the present invention, a windscreen wiper device for cleaning a windshield of a vehicle is provided. The windscreen wiper device includes an elongated wiper strip of a flexible material for sealing against the windshield and at least one carrier element extending between opposing end portions. The at least one carrier element is coupled to the elongated wiper strip to bias the elongated wiper strip into a predetermined configuration. The windscreen wiper device also includes a frame structure with a plurality of claws in engagement with the at least one carrier element and including at least two end caps slidably supporting the end portions of the at least one carrier element. At least the end portions of the at least one carrier element are curved when in a relaxed state to bias the wiper strip against the windshield, and the end caps are pivotably coupled to at least an adjacent portion of the frame structure.

In operation, the ends of the wiper strip are biased against the windshield by the curved carrier element or elements to seal against the windshield while the end caps pivot freely relative to at least the adjacent portions of the frame structure. The remaining portions of the wiper strip may be biased against the windshield either by elements of the frame structure other than the end caps or by other curved portions of the carrier strips or combinations thereof.

According to another aspect of the present invention, the frame structure further includes a main bridge extending generally between the end caps, and wherein the end caps are pivotable relative to the main bridge. The exterior surfaces of the main bridge and the end caps are all generally spoiler shaped to create an aerodynamic down force against the carrier elements to further bias the wiper strip against the windshield when the vehicle is travelling at speed to improve the seal between the wiper strip and the windshield. This aerodynamic down force is substantially the only biasing force imposed by the end caps onto the carrier element and the wiper strip, i.e. there is approximately zero biasing force by the end caps on the carrier element and the wiper strip when the vehicle is stationary.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 6 is a perspective and fragmentary view of a portion of a main bridge from the wiper blade assembly of FIG. 1;

FIG. 7 is a cross-sectional view of the main bridge taken along line 7-7 of FIG. 6; and FIG. 8 is a perspective and elevation view of a pair of carrier elements from the wiper blade assembly of FIG. 1.

DESCRIPTION OF THE ENABLING EMBODIMENT

Figure 1:
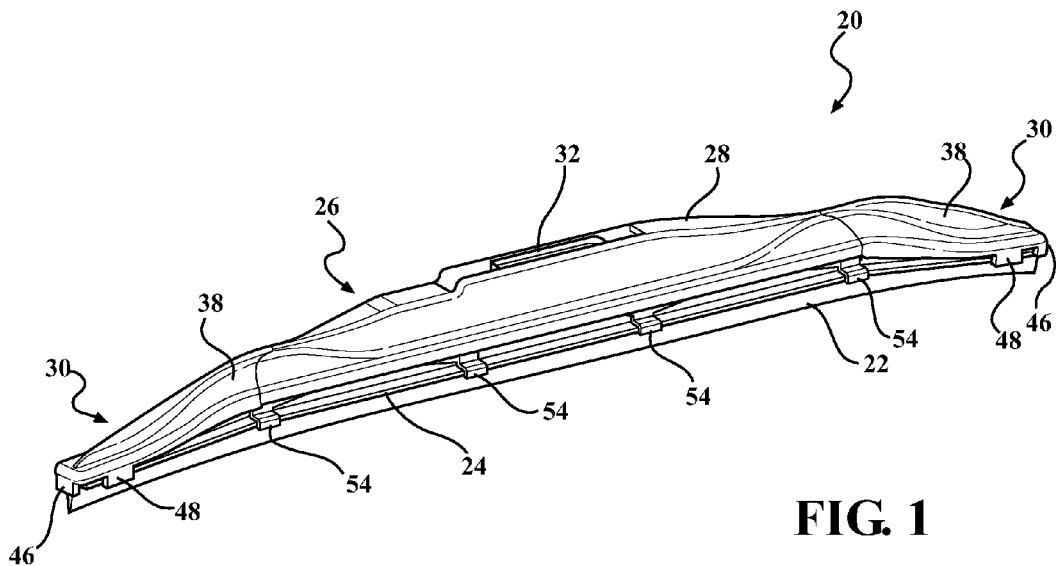
FIG. 1 is a perspective and elevation view of an exemplary wiper blade assembly.

Referring to the Figures, wherein like numerals indicate corresponding parts throughout the several views, an exemplary embodiment of a hybrid windscreen wiper device, or a hybrid wiper blade assembly 20, is generally shown in FIG. 1. The exemplary wiper blade assembly 20 includes a wiper strip 22 of a flexible and resilient material, such as rubber, for sealing against a vehicle's windshield and for driving rain, snow, ice or other elements away therefrom. The exemplary wiper strip 22 includes a pair of oppositely facing grooves that extend substantially the entire longitudinal length of the wiper strip 22 and receive a pair of carrier elements 24 (also known as flexors) to bias the wiper strip 22 into a predetermined configuration. The carrier elements 24 are formed from thin strips a flexible and spring-like material, such as spring steel. The carrier elements 24 are preferably entirely slidably disposed within the grooves or locked into engagement with the wiper strip 22 at only one location, such that the remaining portions of the wiper strip 22 may slide relative to the carrier elements 24 in a lengthwise direction. Either of these configurations has the effect of relieving internal stresses within the wiper strip 22 when it is bent to conform to the curvature of a windshield (not shown) to improve the wipe quality and durability of the wiper blade assembly 20.

Figure 2:
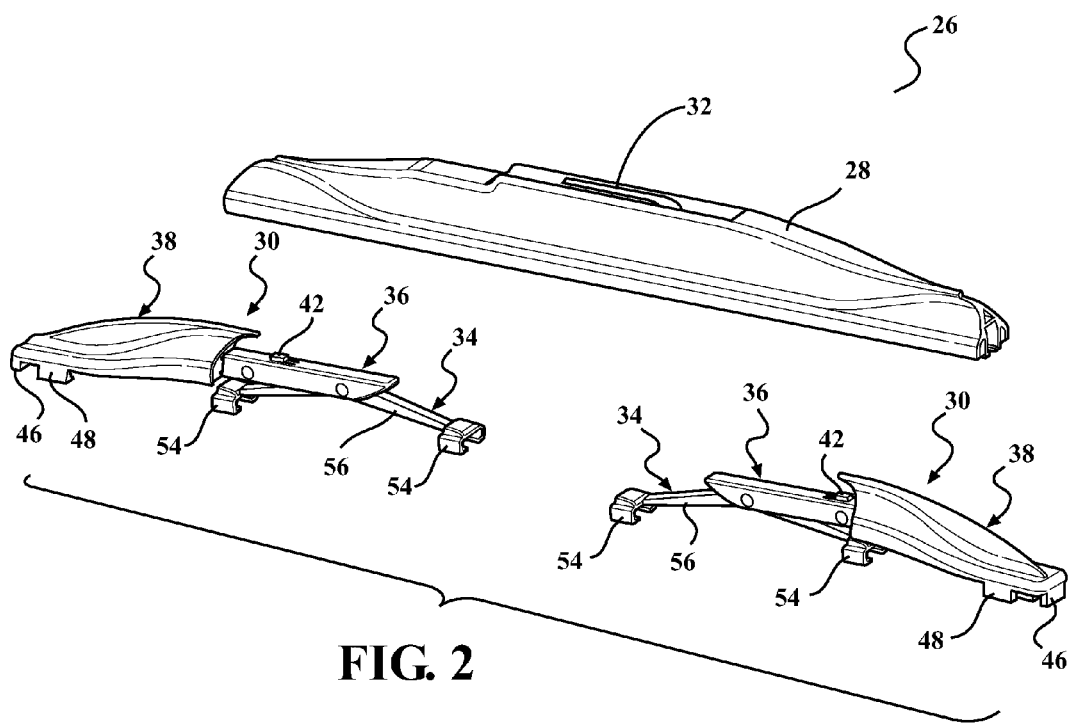
FIG. 2 is a partially exploded view of the wiper blade assembly of FIG. 1.

The exemplary wiper blade assembly 20 also includes a frame structure 26 which is coupled to the carrier elements 24 and distributes a force from a wiper arm (not shown) across a portion of the wiper strip 22 to seal that portion of the wiper strip 22 against the windshield. As best shown in the partially exploded view of FIG. 2, the exemplary frame structure 26 includes a main bridge 28 and a pair of end piece sub-assemblies 30 configured for attachment with opposite ends of the main bridge 28. A connecting device 32 is disposed in a generally central location of the main bridge 28 and is configured for attachment to an end of the wiper arm. It should be appreciated that the connecting device 32 could be of a range of different designs for attaching with different types of wiper arms including, for example, hook-style wiper arms, pin-style wiper arms or bayonet-style wiper arms.

Figure 3:
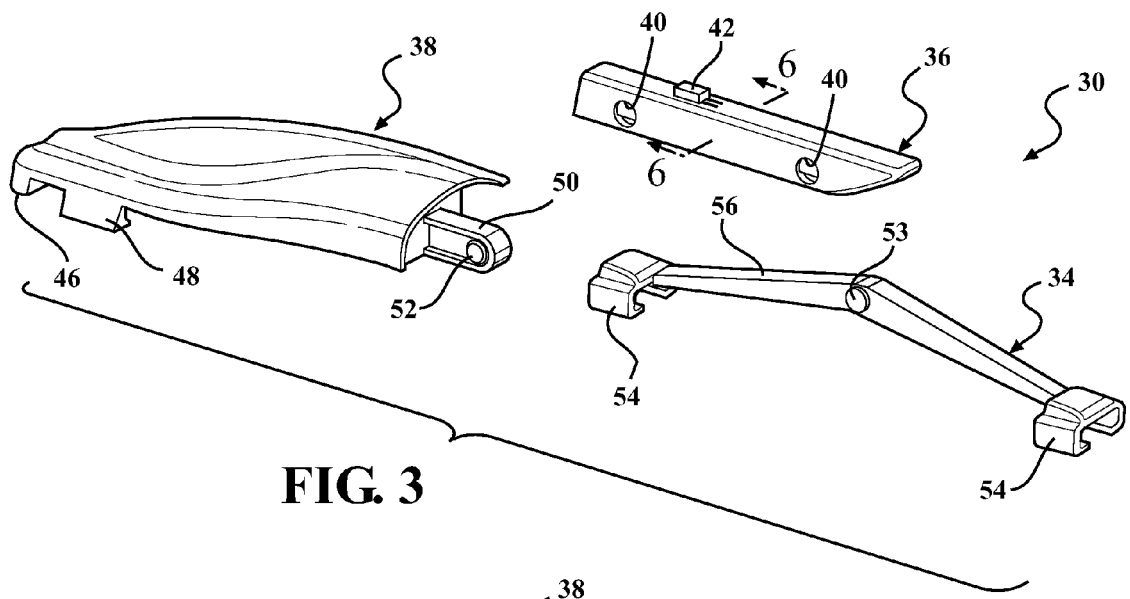
FIG. 3 is an exploded view of an exemplary end piece sub-assembly from the wiper blade assembly of FIG. 1.

Referring now to FIG. 3, an exploded view of one of the end piece sub-assemblies 30 is shown. The exemplary end piece sub-assembly 30 includes a linkage 34, a connecting piece 36 and an end cap 38 (or end cover). The exemplary connecting piece 36 is generally U-shaped as viewed in cross-section and has an upper wall and a pair of side walls. The side walls include two sets of apertures 40 spaced from one another, and the upper wall has a spring loaded tab 42 (or a bayonet) which is located in between the sets of apertures 40. The spring loaded tab 42 is configured to snap into engagement with a recess 44 (shown in FIG. 7) that is shaped similarly to the spring loaded tab 42 and is disposed within the main bridge 28 to interconnect the end piece sub-assembly 30 with the main bridge 28.

Figure 4:
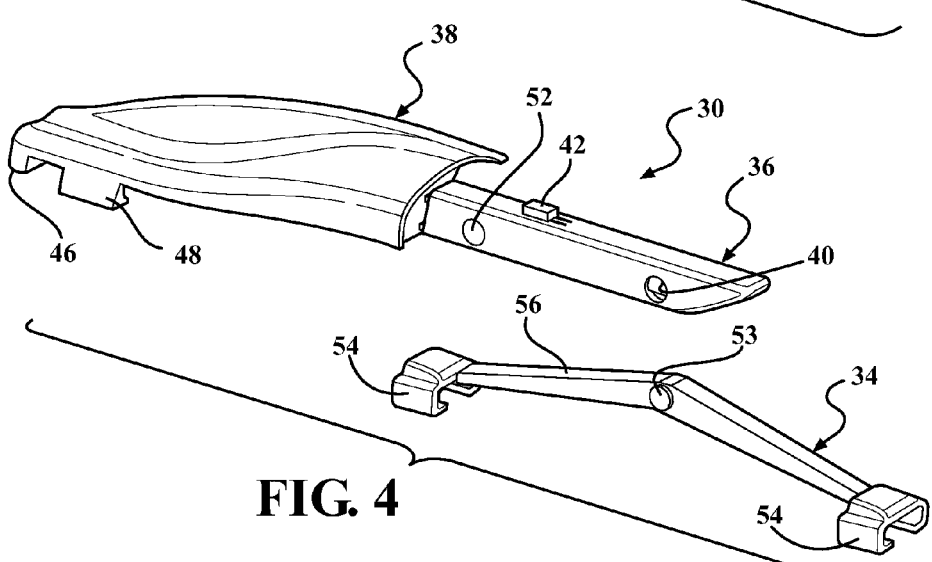
FIG. 4 is a partially exploded view of the end piece sub-assembly of FIG. 3 and showing two of the pieces being coupled together.

As shown, one end of the end cap 38 presents a downwardly extending flange portion 46 and a pair of generally L-shaped holding elements 48 for wrapping partially around and supporting the carrier elements 24 (shown in FIG. 1) without restricting movement of the carrier elements 24 relative to the end cap 38 or the rest of the frame structure 26 in a lengthwise direction, i.e. the holding elements 48 are not clamped, staked or otherwise fixed onto the carrier elements 24. An outwardly extending tongue 50 with a pair of oppositely facing posts 52 is disposed on the end of the end cap 38 opposite of the downwardly extending flange portion 46. As shown in FIG. 4, the posts 52 on the tongue 50 are inserted into one of the sets of apertures 40 on the connecting piece 36 to establish a pivoting relationship between the end cap 38 and the connecting piece 36. As such, the end cap 38 is also pivotable relative to the main bridge 28. The open bottom of the connecting piece 36 allows the end cap 38 to pivot downwardly, and the upper wall of the connecting piece 36 serves as a stopping point to restrict pivoting of the end cap 38 upwardly.

Figure 5:
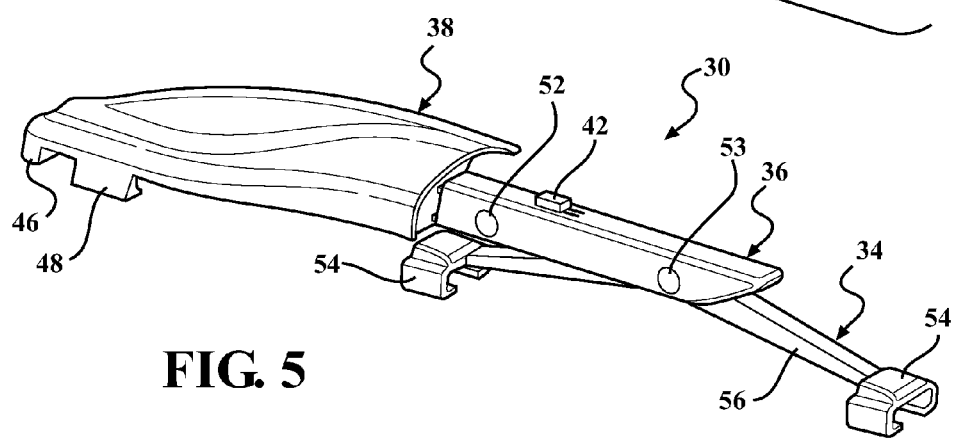
FIG. 5 is a perspective and elevation view of an end piece sub-assembly from the wiper blade assembly of FIG. 1.

The linkage 34 of each end piece sub-assembly 30 includes two sets of claws 54 spaced apart from one another. The sets of claws 54 are interconnected with one another through a V-shaped bridge 56 which has a pair of oppositely extending posts 53 disposed at its apex. As shown in FIG. 5, the posts 53 are inserted into one of the sets of apertures 40 in the connecting piece 36 to establish a pivoting relationship between the linkage 34 and the connecting piece 36. The open bottom of the connecting piece 36 allows the linkage 34 to pivot in two directions. Similar to the holding elements 48 on the end caps 38, the claws 54 are in sliding (i.e., non-fixed) engagement with the exemplary carrier elements 24, thereby biasing the wiper strip 22 against the windshield while also allowing the carrier elements 24 and the wiper strip 22 to slide in a lengthwise direction relative to the linkages 34. This feature improves the wipe quality and durability of the wiper blade assembly 20 by reducing the internal stresses within the carrier elements 24 and the wiper strip 22 when they are bent to conform to the curvature of a windshield.

Referring back to FIG. 1, in the exemplary wiper blade assembly 20, movement of the carrier elements 24 and wiper strip 22 relative to the frame structure 26 is limited by the flange portions 46 on the end caps 38, which are disposed adjacent the ends of the carrier elements 24 and the wiper strip 22. Specifically, the carrier elements 24 and wiper strip 22 may only slide relative to the frame structure 26 within the confines established by the flange portions 46 of the end piece sub-assemblies 30. As such, the wiper blade assembly 20 is configured to prevent the wiper strip 22 or the carrier elements 24 from becoming detached from the frame structure 26.

Referring now to FIG. 8, each of the carrier elements 24 is pre-shaped to present a curved end portion 58 before it is inserted into the groove of the wiper strip 22. Specifically, at least the end portions 58 of the carrier elements 24 are curved concavely downwardly to bias the ends of the wiper strip 22 against a vehicle windshield. As such, between the claws 54 on the linkages 34 of the frame structure 26 and the curved end portions 58 of the carrier elements 24, the entire length of the wiper strip 22 is biased against the windshield to establish a sealing relationship between the wiper blade assembly 20 and the windshield. The curvature is preferably formed into the carrier elements 24 through a roll forming process wherein at least one roller is pressed against the carrier element 24 to plastically deform the material of the carrier element 24 thereby giving the carrier element 24 a curvature as it exits the rollers. This force may be varied, for example by coupling the at least one roller to a cam, which allows a carrier element 24 to be formed with both curved sections and straight sections as well as with sections of differing curvatures. The curvature of the end portions 58 of the carrier elements 24 is preferably chosen such that the wiper strip 22 is substantially uniformly pressed against the windshield to substantially uniformly seal the wiper strip 22 against the windshield. A curvature with a greater radius will result in a lesser seal between the wiper strip 22 and the windshield, whereas a curvature with a smaller radius will result in an stronger seal between the wiper strip 22 and the windshield.

Referring back to FIG. 1, the exterior surfaces of the end caps 38 and the main bridge 28 are generally spoiler shaped. This creates a down force to further bias the wiper strip 22 against the windshield and improve the seal established therebetween and improve the wipe quality when the vehicle is travelling at speeds. In the exemplary embodiment, this aerodynamic down force is substantially the only biasing force applied onto the carrier elements 24 and the wiper strip 22 by the end caps 38 which are freely pivotable relative to the main bridge 28, i.e. any biasing by the end caps 38 onto the carrier elements 24 and the wiper strip 22 from the force of gravity is not substantial.

Obviously, many modifications and variations of the present invention are possible in light of the above teachings and may be practiced otherwise than as specifically described while within the scope of the appended claims.

What is claimed is:

1. A windscreen wiper device for cleaning a windshield of a vehicle, comprising:
   an elongated wiper strip of a flexible material for sealing against the windshield;
   a carrier element extending between opposite end portions and supporting said elongated wiper strip to bias said elongated wiper strip into a predetermined configuration;
   a frame structure including a main bridge and a pair of generally V-shaped linkages which each have a plurality of claws in engagement with said carrier elements between said end portions for biasing a portion of said wiper strip against the windshield and also including at least two end caps slidably supporting said end portions of said at least one carrier element;
   wherein said end caps are operably coupled with said main bridge of said frame structure at pivoting locations which are spaced from said V-shaped linkages for allowing said end caps to pivot relative to said main bridge and wherein at least said end portions of said at least one carrier element are curved when in a relaxed state to bias said wiper strip against the windshield; and
   each of said end piece sub-assemblies further including a connecting piece which is formed as a separate piece from said main bridge and said end cap and said linkage and which operably couples said linkage and said end cap with said main bridge.

2. The windscreen wiper device as set forth in claim 1 wherein said frame structure further includes a pair of end piece sub-assemblies coupled to opposite ends of said main bridge and wherein said end caps are in said end piece sub-assemblies.

3. The windscreen wiper device as set forth in claim 2 wherein each of said end caps includes at least one holding element wrapping partially around said carrier element.

4. The windscreen wiper device as set forth in claim 3 wherein said at least one holding element is further defined as a pair of holding elements.

5. The windscreen wiper device as set forth in claim 4 wherein said holding elements are generally L-shaped.

6. The windscreen wiper device as set forth in claim 2 wherein each of said end piece sub-assemblies also includes one of said linkages with at least one set of said claws in engagement with said carrier element.

7. The windscreen wiper device as set forth in claim 6 wherein said sets of claws are in sliding engagement with said carrier element to allow said carrier element to slide in a lengthwise direction relative to said V-shaped linkages.

8. The windscreen wiper device as set forth in claim 7 wherein each of said end caps further includes a downwardly extending flange portion disposed next to adjacent ends of said carrier element to establish confines for restricting the movement of said carrier element and said wiper strip relative to said frame structure in said lengthwise direction.

9. The windscreen wiper device as set forth in claim 1 wherein said connecting piece of each end piece sub-assembly includes sets of apertures for receiving posts on said end cap and said linkage to establish pivoting relationships between said end cap and said connecting piece and between said linkage and said connecting piece.

10. The windscreen wiper device as set forth in claim 9 wherein each of said connecting pieces is generally U-shaped as viewed in cross-section with a pair of side walls and an upper wall.

11. The windscreen wiper device as set forth in claim 10 wherein said apertures on said connecting pieces are on said side walls.

12. The windscreen wiper device as set forth in claim 10 wherein each of said connecting pieces includes a spring loaded tab on its upper wall for snapping into engagement with said main bridge.

13. A windscreen wiper device for cleaning a windshield of a vehicle, comprising:
   an elongated wiper strip of a flexible material for sealing against the windshield;
   a carrier element extending between opposite end portions and in engagement with said elongated wiper strip to bias said elongated wiper strip into a predetermined configuration;
   a frame structure including a plurality of claws in engagement with said carrier element between said end portions for biasing a portion of said wiper strip against the windshield and also including at least two end caps slidably supporting said end portions of said carrier element;
   wherein said frame structure includes a main bridge and a pair of end piece sub-assemblies coupled to opposite ends of said main bridge and wherein said end caps are in said end piece sub-assemblies;
   wherein each of said end piece sub-assemblies includes a generally V-shaped linkage and said end cap and a connecting piece which is made as a separate piece from said linkage and said end cap and said main bridge and which interconnects said linkage and said end cap with said main bridge;
   wherein said connecting piece of each end piece sub-assembly includes sets of apertures for receiving posts on said end cap and said V-shaped linkage to establish pivoting relationships between said end cap and said connecting piece and between said linkage and said connecting piece;
   wherein each of said connecting pieces is generally U-shaped as viewed in cross-section with a pair of side walls and an upper wall; and
   wherein said end caps are operably coupled with said main bridge of said frame structure via said connecting pieces at pivoting locations which are spaced from said V-shaped linkages for allowing said end caps to pivot relative to said main bridge and wherein at least said end portions of said carrier element are curved when in a relaxed state to bias said wiper strip against the windshield wherein each of said end caps includes a tongue extending outwardly and presenting said posts to establish said pivoting relationship between said end cap and said connecting piece.

14. The windscreen wiper device as set forth in claim 1 wherein said carrier element is generally linearly shaped between said curved end portions when said carrier element is in said relaxed state.

* * * * *